United States Patent [19]

Sandelman et al.

[11] Patent Number: 4,755,730

[45] Date of Patent: Jul. 5, 1988

[54] VARIABLE RESISTANCE OUTPUT MOTOR CONTROLLER

[75] Inventors: David Sandelman, Secaucus; Douglas J. Lionetti, Northvale; Daniel E. Shprecher, Highland Lakes, all of N.J.

[73] Assignee: Heat-Timer Corporation, Fairfield, N.J.

[21] Appl. No.: 128,705

[22] Filed: Dec. 4, 1987

[51] Int. Cl.[4] .............................................. H02P 3/00
[52] U.S. Cl. ..................................... 318/341; 318/334; 318/480
[58] Field of Search ............... 318/334, 480, 341, 490, 318/399, 599

[56] References Cited

U.S. PATENT DOCUMENTS

| | | | |
|---|---|---|---|
| 4,216,421 | 8/1980 | Dupont | 318/399 X |
| 4,221,996 | 9/1980 | Kaisha | 318/473 X |
| 4,225,812 | 9/1980 | Kraus | 318/334 X |
| 4,426,604 | 1/1984 | Doeman et al. | 318/334 |
| 4,599,548 | 7/1986 | Schultz | 318/341 |
| 4,722,669 | 2/1988 | Kundert | 318/334 |

OTHER PUBLICATIONS

Automatic Control Principles—Honeywell, Minneapolis, Minnesota, Form No. 71-97152, pp. 32-35.

*Primary Examiner*—Benjamin Dobeck
*Attorney, Agent, or Firm*—McAulay, Fields, Fisher, Goldstein & Nissen

[57] ABSTRACT

In a thermostatic control system a solid state motor controller is provided by reproducing a potentiometer tracking with a CPU producing appropriate complimentary square wave signals having the duty cycle thereof proportional to a sensed temperature. The square wave signals are fed to circuits which are disposed across two output resistors and the effective resistance of the two resistors are varied in response to the duty cycle.

13 Claims, 2 Drawing Sheets

Power Input

VARIABLE RESISTANCE OUTPUT MOTOR CONTROLLER

BACKGROUND OF THE INVENTION

The present invention relates to a servo-motor control for use in a control system.

The prior art comprises a bridge circuit incorporating a variable resistor (potentiometer) feeding a servo-motor control. The variable resistor feeds one portion of a relay and the other portion of the relay is connected to another variable resistor driven by the output shaft of the servo-motor. When the control offsets one portion of the bridge, the motor will rotate until the other portion of the bridge is balanced. The control offsets one portion of the bridge by the use of a control mechanism sensitive to the controlled medium which moves the sliding arm on a potentiometer to vary resistance values. Such prior art construction is disclosed, for example, in Automatic Control Principles, published by Honeywell of Minneapolis, Minn. under Publication No. 71-97152 at pages 32-35.

SUMMARY OF THE INVENTION

The main object of the present invention is to provide an improved motor controller which can be made of solid state components, while achieving the same kind or improved motor control.

In accordance with the invention, a circuit is provided which effectively reproduces the potentiometer tracking of the prior art devices.

The invention is carried out in accordance with the present invention by first and second output resistors connected in series. One control output terminal is at the juncture of the two output resistors and the other two motor control output terminals are at the other ends of the output resistors.

Means including an analog circuit or microprocessor is responsive to a sensed controlled parameter from a solid state sensor for producing a periodic control signal having a duty cycle proportional to the sensed controlled parameter. First and second means are connected in parallel with the first and second output resistors respectively and are responsive to the control signal for varying the resistance between the central output terminals and the other two output terminals.

In a preferred embodiment the first and second means comprises a photovoltaic relay disposed across a respective output resistor. In a modified embodiment, the first and second means comprise solid state AC switches connected across the respective output resistors. In yet another modified embodiment, the motor controller is further isolated from the microprocessor by a phototransistor which is connected to each transistor switch for activating same to open and short the input of the diode bridge rectifier, and a light emitting diode for each phototransistor which is receptive of the control signal from the CPU and which transmits light to the phototransistor to switch same.

These and other features and advantages of the present invention will become more apparent from the following detailed description taken with the attached drawing, wherein:

DETAILED DESCRIPTION OF THE INVENTION

Figure 1:
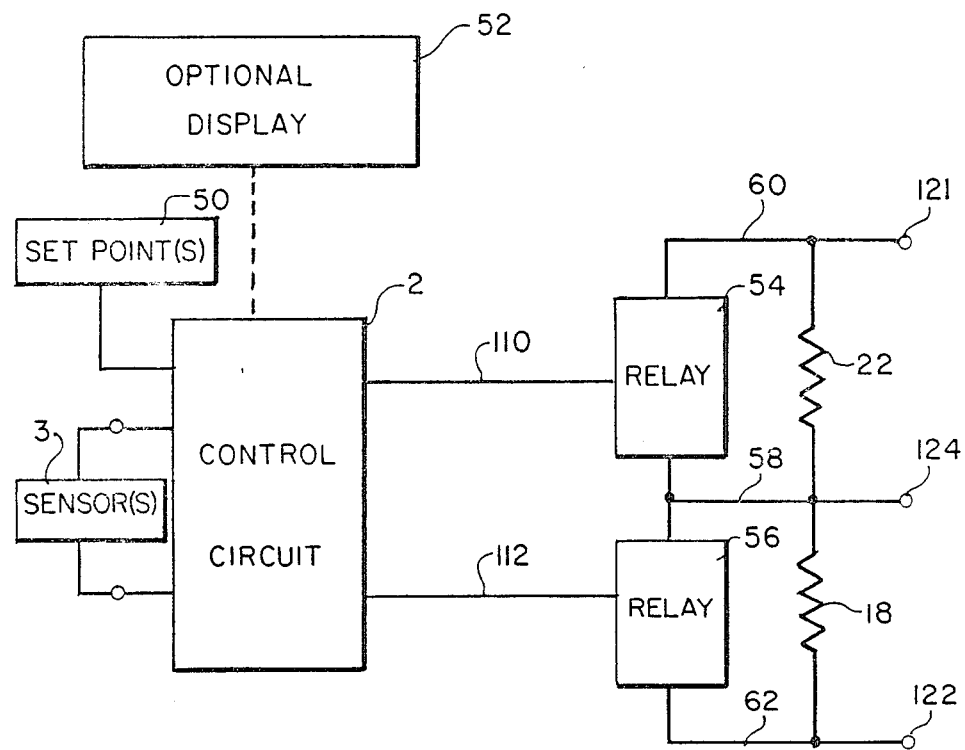
FIG. 1 is a schematic circuit wiring diagram of the motor controller of the present invention.
Figure 1:
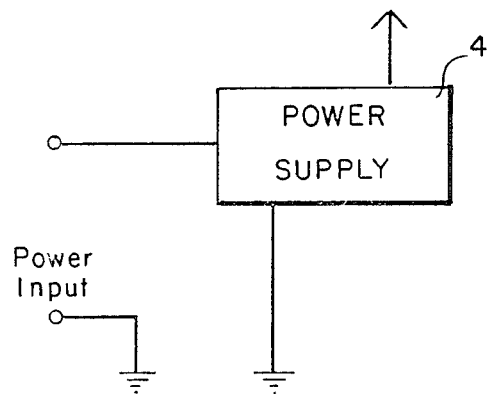

FIG. 1 illustrates a generalized schematic diagram of the present system and includes a power supply 4 for supplying power to each of the element shown therein. A control circuit which may be in the form of a CPU 2 is provided and receives an output signal from sensor 3 which monitors the value of the particular parameter being measured. The sensor may include an analog to digital (A/D) converter so that the signal applied to the control circuit 2 is a digital signal. Additionally, desired set point signals may be applied to the control circuit 2 via a set point circuit 50 which establishes the values of the desired points, as noted in greater detail below. Optionally, the output of the control circuit 2 may be connected to a display 52 which displays the set point values and the sensed parameters from the sensor 3.

Connected to the output terminals of the control circuit 2 are leads 110 and 112. The signal appearing on the leads 110 and 112 comprise square wave pulse trains which have complimentary duty cycles which are controlled by the control circuit 2 in response to the value of the second parameter.

The output leads 110 and 112 are connected to the respective relays 54 and 56. The relays may comprise photovoltaic relays manufactured by the Crydom Division of International Rectifier, El Segundo, Calif., Series PVA, Model No. PVA3354. Relay 54 is connected across resistor 22 and relay 56 is connected across resistor 18. One of the resistors 22 and 18 are connected to a central output terminal 124 which, in turn, is connected to a common terminal of the relays 54 and 56 by a lead 58. The other terminal of relay 54 is connected to the free end of the resistor 22 and an output terminal 121 by a lead 60. Similarly, the other terminal of relay 56 is connected to the free end of the resistor 18 and an output terminal 122 by a lead 62. The output terminals 121, 122 and 124 are the three terminals which may be connected to a servo-motor for controlling the same. For example, terminals 121, 122 and 124 may respectively correspond to the terminals W, B and R shown in FIG. 63 on page 52 of the aforementioned Honeywell publication, the disclosure therein being incorporated herein by reference.

In operation, assuming that the circuit is in equilibrium, the signals applied to the leads 110 and 112 will be complimentary. Therefore, when one relay is in the open state, the other relay will be in the closed state. Thus, if the signals applied to leads 110 and 112 are both complimentary, square wave signals having a 50% duty cycle, the resistance presented across terminals 121 and 124 is one-half the resistance of the resistor 22 and the resistance across output terminals 122 and 124 is one-half the resistance of resistor 18.

If a rise in the sensed parameter is required, it is necessary for the resistance across terminals 121 and 124 to increase while the resistance across terminals 124 and 122 should decrease. Thus, to raise the sensed parameter, the duty cycle of the output at line 110 will increase from 50% to between 50% and 100% and the duty cycle of the signal on line 112 will likewise decrease a corresponding amount.

As a result, the proportion of each cycle that the relay 54 shorts resistor 22 will be decreased whereas the time the relay 56 shorts resistor 18 will be increased thereby increasing the effective resistance of the former and decreasing the effective resistance of the latter.

Taking an extreme case, if an extremely low value is required, the control circuit will cause the signal on lead 110 to assume a 0 duty cycle whereas the signal on the lead 112 will assume a 100% duty cycle. This will cause the relay 54 to essentially short out the resistor 22 whereas the resistance of resistor 18 will appear as its full resistance.

It is obvious that the opposite will occur for an extremely high temperature.

In an alternate embodiment, the relays 54 and 56 may comprise solid state AC switches.

Figure 2:
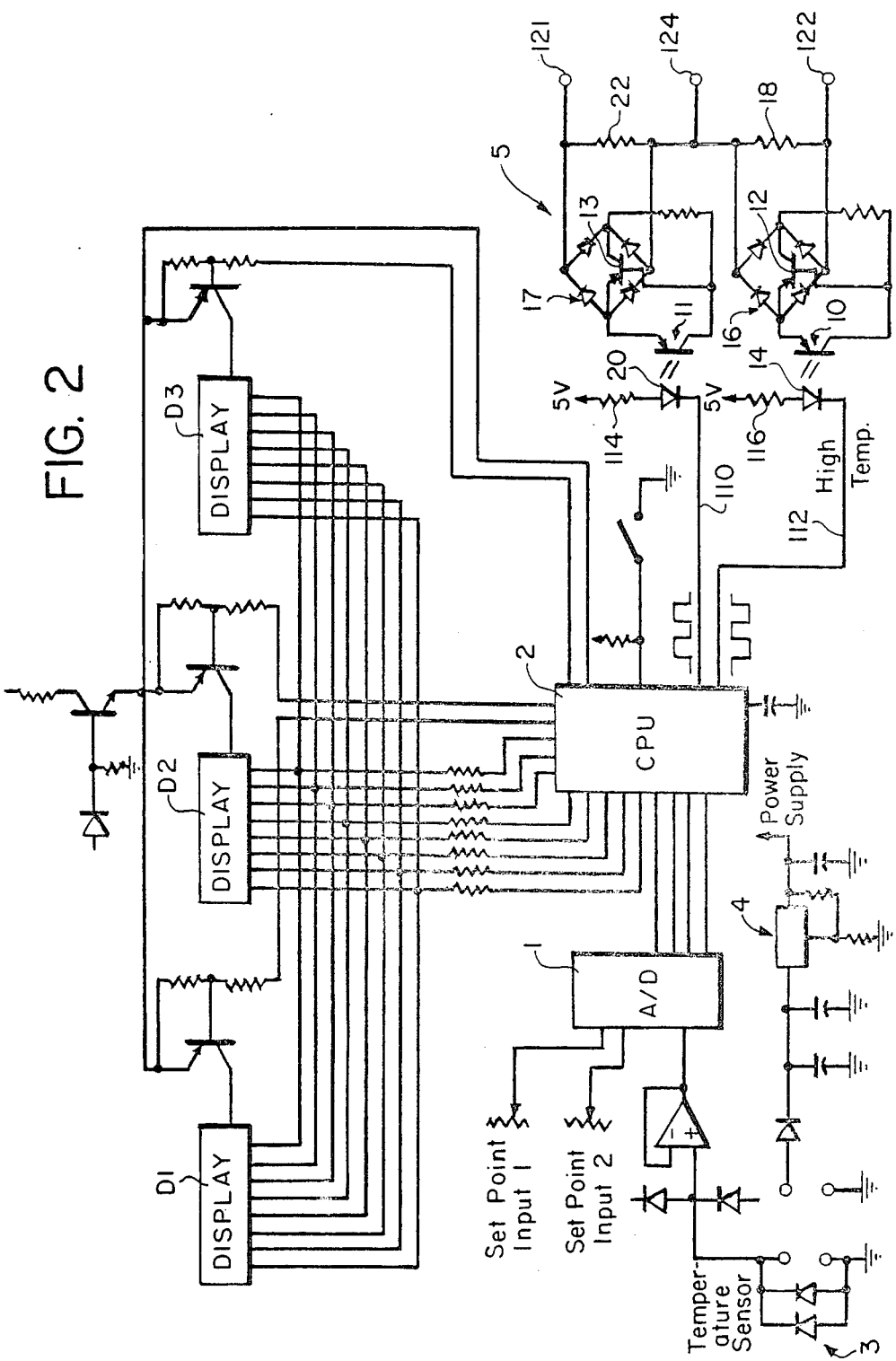
FIG. 2 is a schematic circuit wiring diagram of a modified embodiment thereof.

Another and more specific embodiment of the present invention, which may be used in connection with a temperature control, is shown in FIG. 2. The system includes a power supply 4 for supplying power to each of the elements. The control circuit of CPU receives an output from the analog to digital or A/D converter 1. The input terminals of the A/D converter 1 are connected to set point input 1 and set point input 2. A temperature sensor 3 is similarly applied to an input terminal of the converter 1. The converter 1 receives the analog value of the temperature sensor as well as the analog values of the various set point inputs and converts these to appropriate digital signals at the output terminals thereof.

The CPU 2 may have output terminals connected to displays D1, D2 and D3 for displaying the set point values and the sensed temperatures. Additionally, the CPU has outputs on lines 110 and 112 which comprise the square waves type pulse trains having a complimentary duty cycles which are controlled by the CPU in response to the sensed temperature.

The motor controller 5 in accordance with the invention includes the leads 110 and 112 connected to biasing supplies through light emitting diodes 20 and 14, respectively, and biasing resistors 114 and 116 respectively. The light from light emitting diodes 20 and 14 are sensed by photosensitive transistors 11 and 10 respectively.

Phototransistor 11 is connected across transistor switch 13 and phototransistor 10 is connected across transistor switch 12 as shown. When LED 20 conducts, phototransistor 11 is driven into conduction and switching transistor 13 is off. When LED 20 is not in conduction, phototransistor 11 is off and switching transistor 13 is on.

Phototransistor 10 is connected to switching transistor 12 in a similar manner to that of transistors 11 and 13. Similarly, when LED 14 conducts, phototransistor 10 conducts and transistor 12 is open. When phototransistor 14 is not conducting, phototransistor 10 is off and transistor switch 12 is closed.

The motor controller also comprises two diode bridge rectifiers 16 and 17. Bridge 16 has the input thereof connected across transistor 12 and bridge 17 has the input thereof connected across transistor 13. Each set of light emitting diode, phototransistor, switching transistor and bridge rectifier corresponds to a respective one of the switches 54, 56. At the outputs of the two bridges 16 and 17, are the output resistors 22 and 18 respectively which are connected to the central output terminals 24 at one end of each and to the output terminals 121 and 122 at the other ends of each.

When transistor 13 is closed, transistor 12 will be opened due to the complimentary driving signals applied to LED's 20 and 14. When transistor 13 is closed, resistor 22 is effectively shorted so that the resistance between terminals 121 and 124 is zero during that time. During that same time the resistance across terminals 122 and 124 is the resistance of resistor 18 since transistor 12 is opened and the diode bridge prevents any current flowing thereacross.

The operation of the circuit of FIG. 2 is substantially the same as the operation of the circuit of FIG. 1.

It will be appreciated that the instant applications, design configurations, specification and claims are set forth by way of illustration and not limitation, and that various modifications and changes may be made without departing from the spirit and scope of the present invention.

What is claimed is:

1. In a control system having a motor controller and a motor controlled by the motor controller for controlling the value of a sensed parameter in response to a change in the same, the improvement wherein the motor controller comprises: first and second output resistors connected in series; one motor control output terminal at the juncture of the two output resistors and a respective second motor control output terminal at the other ends of the two output resistors; means responsive to the sensed parameter for producing a periodic control signal having a duty cycle responsive to the control action required to change the controlled parameter; and first and second means respectively connected in parallel and with the first and second resistors and responsive to the control signal for varying the effective resistance between the one output terminal and the other two output terminals.

2. The system according to claim 1, wherein the control signal producing means comprises means for producing the control signal and its inverse for applying to the first and second means respectively.

3. In a thermostatic control system having a motor controller and a motor controlled by the motor controller for controlling heat in response to a desired change in temperature, the improvement wherein the motor controller comprises: first and second output resistors connected in series; one motor control output terminal at the junction of the two output resistors and two motor control output terminals at the other ends of the two output resistors; means responsive to a sensed temperature for producing a periodic control signal having a duty cycle responsive to the sensed temperature; and first and second means connected in parallel with the first and second output resistors respectively and responsive to the control signal for varying the effective resistance between the one output terminal and the other two output terminals.

4. The system according to claim 3, wherein the first and second means comprise relays.

5. The system according to claim 4, wherein said relays are photovoltaic relays.

6. The system according to claim 3, wherein each of the first and second means comprises a diode bridge rectifier having a switch across the input thereof and the output resistor across the output thereof.

7. The system according to claim 6, wherein the switch is a transistor switch and the first and second means each further comprise a phototransistor connected to the transistor switch for activating same to open and short the input of the diode bridge rectifier and a light emitting diode receptive of the control signal for applying light to the phototransistor.

8. The system according to claim 7, wherein control signal producing means comprises means for producing the control signal and its inverse for applying to the first and second means respectively.

9. A motor controller comprising: first and second output resistors connected in series; one motor control output terminal at the juncture of the two output resistors and two motor control output terminals at the other ends of the two output resistors; means responsive to a sensed parameter for producing a periodic control signal having a duty cycle responsive to the sensed parameter; and first and second means connected in parallel with the first and second output resistors respectively and responsive to the control signal for varying the resistance between the one output terminal and the other two output terminals.

10. The system according to claim 9, wherein said first and second means comprise photovoltaic relays.

11. The system according to claim 9, wherein each of the first and second means comprises a diode bridge rectifier having a switch across the input thereof and the output resistor across the output thereof.

12. The system according to claim 11, wherein the switch is a transistor switch and the first and second means each further comprises a phototransistor connected to the transistor switch for activating same to open and short the input of the diode bridge rectifier, and a light emitting diode receptive of the control signal for applying light to the phototransistor.

13. The system according to claim 12, wherein said control signal producing means comprises means for producing the control signal and its inverse for applying to the first and second means respectively.

* * * * *